United States Patent
Hur et al.

(10) Patent No.: US 9,201,266 B2
(45) Date of Patent: Dec. 1, 2015

(54) BACKLIGHT UNIT AND MANUFACTURING METHOD THEREOF, AND LIQUID CRYSTAL DISPLAY DEVICE HAVING THE SAME

(75) Inventors: Gil-tae Hur, Suwon-si (KR); Hyeong-sik Choi, Hwaseong-si (KR); Kun-ho Cho, Suwon-si (KR); Jeong-phil Seo, Suwon-si (KR); Yong-hun Kwon, Anyang-si (KR); Kye-hoon Lee, Suwon-si (KR); Suk-ju Choi, Jeonju-si (KR); Young-min Lee, Buncheon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 275 days.

(21) Appl. No.: 13/462,412

(22) Filed: May 2, 2012

(65) Prior Publication Data

US 2013/0050612 A1    Feb. 28, 2013

(30) Foreign Application Priority Data

Aug. 26, 2011 (KR) .......................... 10-2011-0085525

(51) Int. Cl.
*F21V 7/04* (2006.01)
*G02F 1/1333* (2006.01)
(Continued)

(52) U.S. Cl.
CPC .......... *G02F 1/133603* (2013.01); *G02B 6/009* (2013.01); *G02B 6/0073* (2013.01);
(Continued)

(58) Field of Classification Search
CPC ................ G02F 1/133603; G02F 1/133608; G02F 1/133615; G02B 6/0026; G02B 6/0073; G02B 6/0091

USPC .......... 362/293, 612, 608; 349/58, 61–62, 65, 349/69

See application file for complete search history.

(56) References Cited

U.S. PATENT DOCUMENTS

| 2005/0185113 A1 | 8/2005 | Weindorf et al. |
| 2006/0001037 A1 | 1/2006 | Schardt et al. |

(Continued)

FOREIGN PATENT DOCUMENTS

| CN | 1981220 A | 6/2007 |
| CN | 101788737 A | 7/2010 |

(Continued)

OTHER PUBLICATIONS

Communication dated Sep. 17, 2012 from the European Patent Office in counterpart European application No. 12166562.4.

(Continued)

*Primary Examiner* — Nathanael R Briggs
(74) *Attorney, Agent, or Firm* — Sughrue Mion, PLLC

(57) ABSTRACT

A backlight unit is provided which includes: a light guide plate which guides incident light from a lateral side of the light guide plate toward a liquid crystal display (LCD) panel placed in front of the light guide plate; a light source unit which includes a light source which emits the light and a light source supporting member which supports the light source and is arranged adjacent to the lateral side of the light guide plate; a supporting frame which is arranged in the backlight unit; a quantum dot (QD) bar which is arranged between the lateral side of the light guide plate and the light source and changes a color of the light emitted from the light source; and a QD-bar fastening unit which fastens the QD bar to at least one of the light source supporting member and the supporting frame.

20 Claims, 18 Drawing Sheets

(51) Int. Cl.
*G02F 1/1335* (2006.01)
*F21V 8/00* (2006.01)

(52) U.S. Cl.
CPC ........ *G02B6/0085* (2013.01); *G02F 1/133615* (2013.01); *G02F 2001/133317* (2013.01); *G02F 2001/133614* (2013.01); *Y10T 29/49002* (2015.01)

(56) References Cited

U.S. PATENT DOCUMENTS

| | | | |
|---|---|---|---|
| 2006/0250821 A1* | 11/2006 | Kang et al. | 362/657 |
| 2010/0283914 A1* | 11/2010 | Hamada | 348/731 |
| 2011/0141769 A1* | 6/2011 | Lee et al. | 362/629 |
| 2012/0287373 A1* | 11/2012 | Tsai et al. | 349/62 |

FOREIGN PATENT DOCUMENTS

| | | |
|---|---|---|
| JP | 10-269822 A | 10/1998 |
| KR | 10-2011-0012246 A | 2/2011 |
| KR | 10-2011-0068110 A | 6/2011 |
| KR | 1020110080088 A | 7/2011 |
| WO | WO 2011081014 A1 * | 7/2011 |

OTHER PUBLICATIONS

Communication from the State Intellectual Property Office of P.R. China dated Sep. 6, 2015, in a counterpart Chinese application No. 201210303205.8.

* cited by examiner

FIG. 16
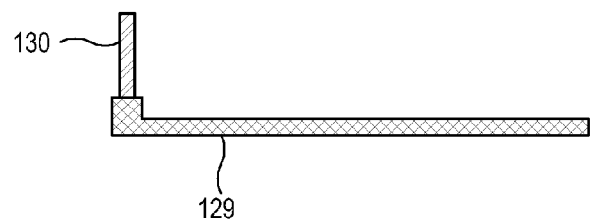
(a)
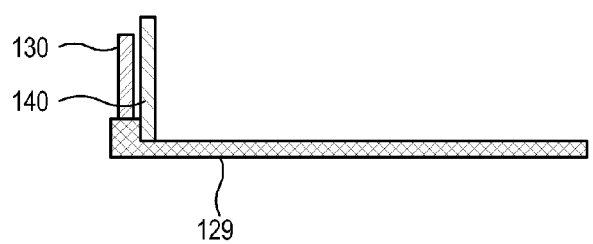
(b)
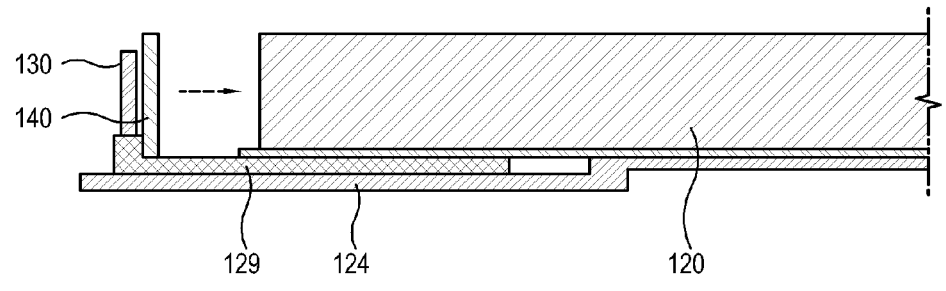
(c)
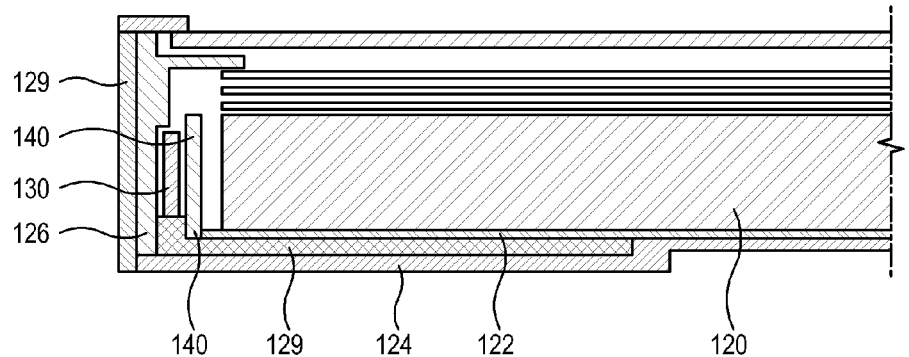
(d)

FIG. 17
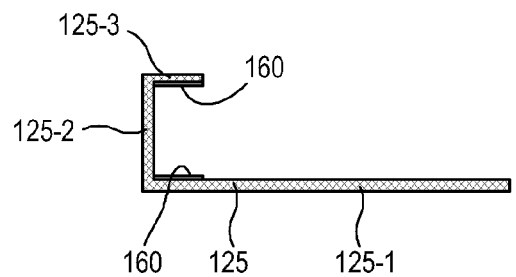
(a)
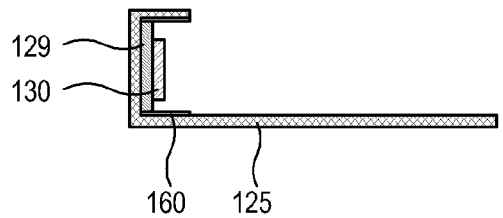
(b)
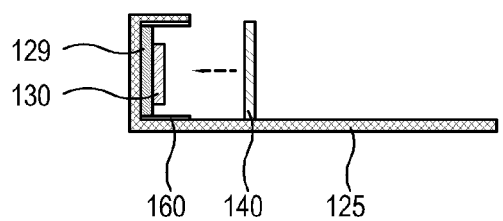
(c)
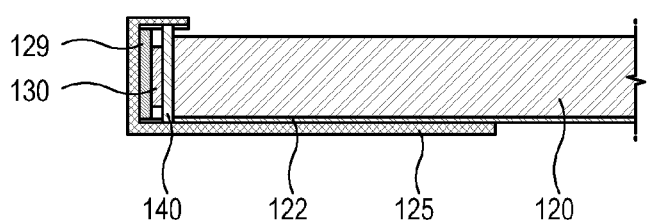
(d)
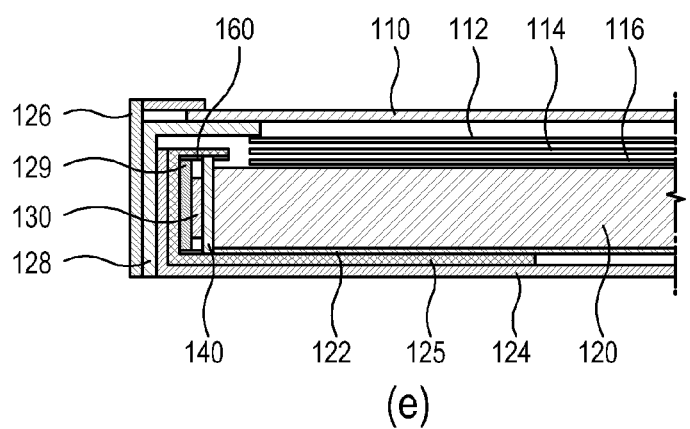
(e)

BACKLIGHT UNIT AND MANUFACTURING METHOD THEREOF, AND LIQUID CRYSTAL DISPLAY DEVICE HAVING THE SAME

CROSS-REFERENCE TO RELATED APPLICATION

This application claims priority from Korean Patent Application No. 10-2011-0085525, filed on Aug. 26, 2011 in the Korean Intellectual Property Office, the disclosure of which is incorporated herein by reference.

BACKGROUND

1. Field

Apparatuses and methods consistent with the exemplary embodiments relate to a liquid crystal display (LCD) device, and more particularly, to a backlight unit employing a quantum dot (QD) bar and a light emitting diode (LED) as a light source, a manufacturing method thereof, and an LCD device having the same.

2. Description of the Related Art

A backlight unit for an LCD device includes light emitting diodes 10 arranged along a lateral side of a light guide plate 20 as shown in FIG. 18. Light emitted from the LED 10 enters the lateral sides of the light guide plate 20, propagates to the center of the light guide plate 20 by total reflection, and exits the light guide plate 20 through a front patterned surface, thereby materializing a surface light source.

Usually, white LEDs emitting monochromatic light have been used as the LEDs 10 arranged along the lateral sides of the backlight unit. The white LEDs generally emit white light by using a Blue-chip along with green and red phosphors.

The LEDs 10 used in the related art backlight unit employs a single LED package that emits one color, and therefore their color reproduction is just 75% of a national television system committee (NTSC) area. Also, the color reproduction, efficiency and white coordinate of a panel is susceptible to matching between a peak wavelength of three colors, red, green and blue (R, G, B), of the white LED and a peak wavelength of a color filter for the liquid crystal of the LCD device.

To make up for deterioration in the color reproduction of the white LED used in the related art backlight unit, there has been proposed technology of using a blue LED 10 instead of the white LED and a quantum dot (QB) bar 30 as a light source of the backlight unit, disclosed in Korean Patent Publications No. 10-2011-0068110 and No. 10-2011-0012246.

As shown in FIG. 19, the QD bar 30 is adhered between the blue LED 10 and the light guide plate 20 by a transparent optical resin layer or an adhesive layer 40, 50. However, it is very inconvenient to use the optical resin layer or the adhesive layer 40, 50 in the adhesion for the QD bar 30, and thus productivity decreases. Further, the optical resin layer or the adhesive may distort the light emitted from the LED and the QD bar.

Also, heat generated by the LED is transferred to the light guide plate 20 via the optical resin layer or the adhesive layer, and therefore the light guide plate 20 is twisted, thereby having an effect on the adhered QD bar 30 which damages the QD bar 30.

SUMMARY

Accordingly, one or more exemplary embodiments provide a backlight unit which is excellent in color reproduction, and an LCD device having the same.

Another exemplary embodiment is to provide a backlight unit having a structure in which heat generated from an LED is not transferred to a light guide plate, and an LCD device having the same.

Still another exemplary embodiment is to provide a backlight unit to which a QD bar can be easily fastened, and a manufacturing method thereof.

Yet another exemplary embodiment is to provide a backlight unit having a structure for improving workability and increasing productivity, and a manufacturing method thereof.

Still another exemplary embodiment is to provide a backlight unit having a structure in which light emitted by an LED is transferred to a light guide plate without distortion, and an LCD device having the same.

The foregoing and/or other aspects may be achieved by providing a backlight unit including: a light guide plate which guides incident light from a lateral side of the light guide plate toward a liquid crystal display (LCD) panel placed in front of the light guide plate; a light source unit which comprises a light source which emits the light and a light source supporting member which supports the light source and is arranged adjacent to the lateral side of the light guide plate; a supporting frame which is arranged in the backlight unit; a quantum dot (QD) bar which is arranged between the lateral side of the light guide plate and the light source and changes a color of the light emitted from the light source; and a QD-bar fastening unit which fastens the QD bar to at least one of the light source supporting member and the supporting frame.

The QD bar may be spaced apart from at least one of the light guide plate and the light source.

The light source may include a blue light emitting diode (LED).

The light source supporting member may include a printed circuit board (PCB) mounted with the light source.

The supporting frame may include at least one of a heat sinking plate which radiates heat from the light source, a light guide plate supporting frame which supports the light guide plate, and a middle molding part which extends along a lateral end of the backlight unit, between a front and a rear of the backlight unit.

The at least one of the heat sinking plate, the light guide plate, and the middle molding part comprises a bending end part which extends from the lateral end of the backlight unit toward the lateral side of the light guide plate.

The QD-bar fastening unit may include an adhesive.

The QD-bar fastening unit may include a groove which is formed in at least one of the light source supporting member and the supporting frame and to which the QD bar is fitted therein.

The QD-bar fastening unit may include a connecting member which connects the QD bar to the light source supporting member.

The connecting member fastens the QD bar to the light source supporting member such that the QD bar is separated from the light source supporting member so that the light source is accommodated between the light source supporting member and the QD bar.

The QD-bar fastening unit may include a fastening pin coupled to the QD bar; and a socket provided on at least one of the light source supporting member and the supporting frame, and is coupled to the fastening pin.

The QD-bar fastening unit may include a socket coupled to the QD bar; and a fastening pin provided in at least one of the light source supporting member and the supporting frame, and is coupled to the socket.

The QD-bar fastening unit may include a fastening pin which is coupled to the QD bar and has an elastic projection;

and a fastening part which is provided in at least one of the light source supporting member and the supporting frame, and which accommodates and is coupled to the elastic projection.

The QD-bar fastening unit may include a fastening pin which is provided in at least one of the light source supporting member and the supporting frame, and which has an elastic projection; and a fastening part which is coupled to the QD bar, and which accommodates and is coupled to the elastic projection.

The QD-bar fastening unit may include a bolt which is coupled to the QD bar; and a welding part which couples at least one of the light source supporting member and the supporting frame to the fastening pin.

The QD-bar fastening unit may include a fastening pin which is coupled to the QD bar; and a welding part which couples at least one of the light source supporting member and the supporting frame to the fastening pin.

The QD-bar fastening unit may include a groove formed at a lateral end of the backlight unit and which receives the QD bar inserted therein.

Another aspect may be achieved by providing a backlight unit including: a light guide plate which guides incident light from a lateral side of the light guide plate toward a liquid crystal display (LCD) panel placed in front of the light guide plate; a light source unit which comprises a light source which emits the light and a light source supporting member which supports the light source and is arranged adjacent to the lateral side of the light guide plate; a quantum dot (QD) bar which is arranged between the lateral side of the light guide plate and the light source and changes a color of the light emitted from the light source; and a pressing member which is fastened while pressing the QD bar toward the lateral side of the light guide plate.

The pressing member may include at least one of a light source supporting frame, a heat sinking plate which radiates heat from the light source, a light guide plate supporting frame which supports the light guide plate, and a middle molding part which extends along a lateral end of the backlight unit, between a front and a rear of the backlight unit.

Still another aspect may be achieved by providing a method of manufacturing a backlight unit, the method including arranging a light guide plate behind a liquid crystal display (LCD) panel; preparing a light source unit by arranging a light source onto a light source supporting member and fastening a quantum dot (QD) bar to the light source supporting member; arranging the light source unit to a lateral side of the light guide plate so that the QD bar is arranged between the light source and the light guide plate; and fastening the light source unit to a supporting frame arranged in the backlight unit.

The supporting frame may include at least one of a heat sinking plate which radiates heat from the light source, a light guide plate supporting frame which supports the light guide plate, and a middle molding part which extends along a lateral end of the backlight unit, between a front and a rear of the backlight unit.

Yet another aspect may be achieved by providing a method of manufacturing a backlight unit, the method including arranging a light guide plate behind a liquid crystal display (LCD) panel; arranging a quantum dot (QD) bar at a lateral side of the light guide plate; arranging a light source unit comprising a light source such that the QD bar is arranged between the light source and the light guide plate; pressing the QD bar toward the lateral side of the light guide plate by a pressing member so that the QD bar is adhered to the lateral side of the light guide plate; and fastening the pressing member to a supporting frame arranged in the backlight unit.

The pressing member may include at least one of a light source supporting frame which supports the light source, a heat sinking plate which radiates heat from the light source, a light guide plate supporting frame which supports the light guide plate, and a middle molding part which extends along a lateral end of the backlight unit, between a front and a rear of the backlight unit.

The pressing member may include a QD-bar guide groove extended in a direction perpendicular to the lateral side of the light guide plate.

The pressing member may include a QD-bar guide groove extended in a lengthwise direction of the QD bar.

Still another aspect may be achieved by providing a liquid crystal display (LCD) device including the foregoing backlight unit; and a LCD panel which comprises a liquid crystal layer, a thin film transistor layer arranged between the liquid crystal layer and the light guide plate of the backlight unit and which controls light passing through the liquid crystal layer, and a color filter layer which materializes color of light passed through the liquid crystal layer.

BRIEF DESCRIPTION OF THE DRAWINGS

The above and/or other aspects will become apparent and more readily appreciated from the following description of the exemplary embodiments, taken in conjunction with the accompanying drawings, in which:

FIGS. 16(a) to 16(d) are a process view of a manufacturing method of a backlight unit according to an exemplary embodiment;

FIGS. 17(a) to 17(e) are a process view of a manufacturing method of a backlight unit according to another exemplary embodiment;

DETAILED DESCRIPTION

Figure 1:
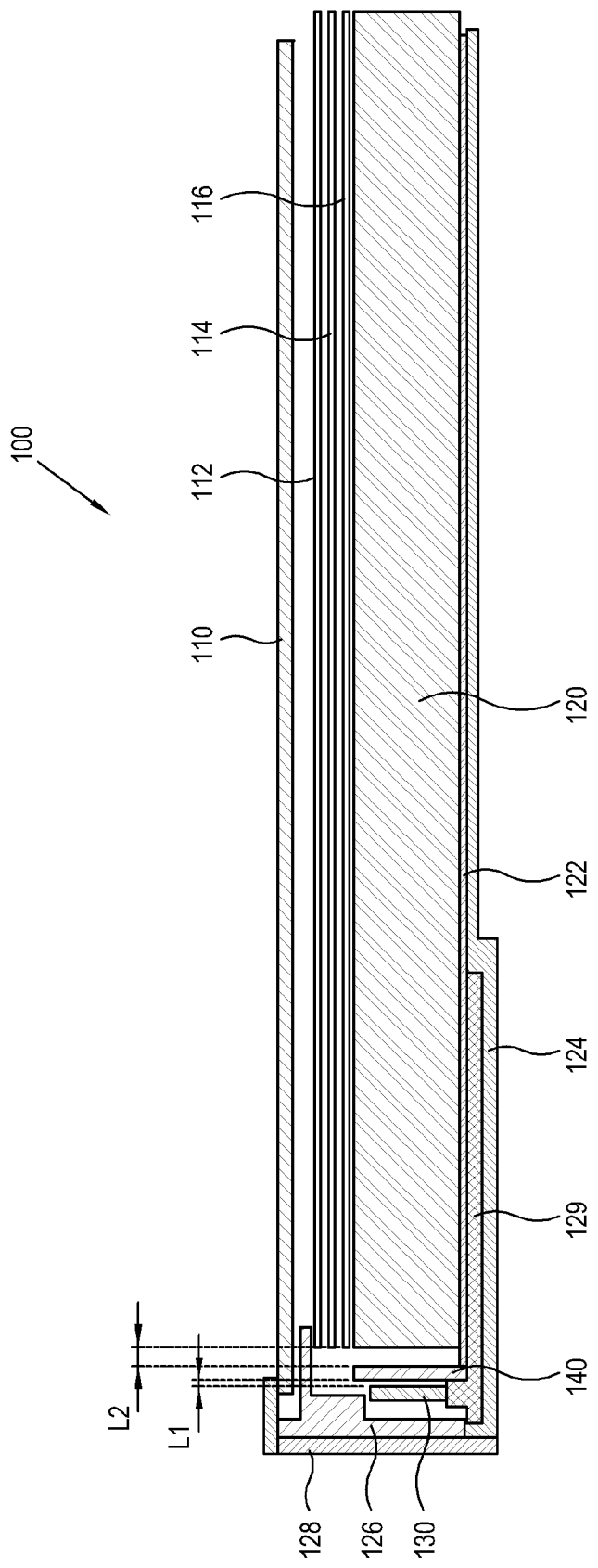
FIG. 1 is a schematic view of an LCD device having a backlight unit according to a first exemplary embodiment.

Below, exemplary embodiments will be described in detail with reference to accompanying drawings. For the convenience of description, elements having no direct relationship to the exemplary embodiments are omitted for clarity, and like reference numerals refer to like elements throughout. Here, the "rear" refers to a direction where a light guide plate 120 is placed in an LCD panel 110, and the "up," "down," "left" and "right" are defined with respect to the front of the LCD panel 110.

As shown in FIG. 1, an LCD device 100 includes an LCD panel 110 and a backlight unit. The backlight unit includes a dual brightness enhance film (DBEF) sheet 112, a prism sheet 114, a diffuser sheet 116, a light guide plate 120, a reflection sheet 122, an LED 130 and a QD bar 140 arranged in sequence on the rear of the LCD panel 110.

In the LCD panel 110, a nematic liquid crystal is interposed between two sheets of glass, and counter electrodes with a thin film transistor are arranged on the two sheets of glass. An electric field applied to the counter electrodes changes a twisted angle of a liquid crystal material interposed between the glass substrates, and adjusts penetration of light emitted from the rear.

The DBEF sheet 112 serves to reduce loss of light exiting from the prism sheet 114 to be described later.

The prism sheet 114 changes side light into front light with regard to the light passed through the diffuser sheet 116 to be described later, and concentrates radiated light, thereby increasing brightness.

The diffuser sheet 116 serves to diffuse the light exiting the light guide plate 120 and make the light uniform. For example, the diffuser sheet 116 may be made of polyester or polycarbonate.

The light guide plate 120 serves to make the light entered from LED 130 be materialized into uniform surface light. For example, the light guide plate 120 may be made of an acrylic mold.

The reflection sheet 122 is placed behind the light guide plate 120, and reflects light scattered from the light guide plate 120, the DBEF sheet 112, the prism sheet 114 and the diffuser sheet 116 toward the front of the LCD device 100.

The LED 130 is placed at lateral sides of the light guide plate 120 while being attached to a printed circuit board 129. The LED 130 may employ a blue LED.

The backlight unit as shown in FIG. 1 is not a direct type where the light source unit 129, 130 is placed behind the light guide plate 120 but an edge type where the light source unit 129, 130 is placed at the sides of the light guide plate 120. Also, the light source unit 129, 130 is a side-view type where the printed circuit board 129 is parallel with the light guide plate 120 and the light is emitted at a side to the light guide plate 120.

The QD bar 140 is arranged between the LED 130 and the side of the light guide plate 120 and is a bar in which quantum dot fluorescent substance is injected. The quantum dot is a particle that generates fluorescent light that is much stronger than that of a general fluorescent material within a narrow wavelength range and forms a core with nano-sized II-IV semiconductor particles (e.g., CdSe, CdTe, CdS, etc).

For example, the QD bar 140 is arranged between the blue LED 130 and the light guide plate 120 and serves to convert blue light from the blue LED 130 into white light.

As shown in FIG. 16(b), the QD bar 140 in this exemplary embodiment is adhered to the printed circuit board 129 supporting the LED 130 by an adhesive. Since the QD bar 140 is attached to the printed circuit board 129 that is a light source supporting member for supporting the LED 130, it can be conveniently and easily fastened thereto. That is, as shown in FIG. 16(c), a manufacturing work is simple because the QD bar 140 together with the LED 130 is attached to the printed circuit board 129 and then the QD bar 140 and the LED 130 are arranged adjacent to each other in a proximity of a lateral side of the light guide plate 120.

Also, if the QD bar 140 is fastened as described above, there is no medium such as an adhesive between the LED 130 and the QD bar 140 and between the QD bar 140 and the light guide plate 120, and therefore there is no distortion of light.

The QD bar 140 may be arranged respectively leaving spaces L1 and L2 (i.e., air gaps) from the LED 130 and the light guide plate 120. Thus, if the QD bar 140 is spaced apart from the LED 130 and from the light guide plate 120, heat generated from the LED 130 cannot be transferred to the light guide plate 120.

Below, operations of a backlight unit according to a first exemplary embodiment will be described with reference to FIG. 1.

The blue light emitted from the blue LED 130 is converted into the white light while passing through the adjacent QD bar 140, and enters the lateral side of the light guide plate 120 that is adjacent to the LED 130/QD bar 140 assembly. The light entering the lateral side of the light guide plate 120 exits the light guide plate 20 through a front patterned surface thereof, thereby materializing a surface light source. Surface light is transferred to the LCD panel 110 via the diffuser sheet 116, the prism sheet 114 and the DBEF sheet 112.

Figure 2:
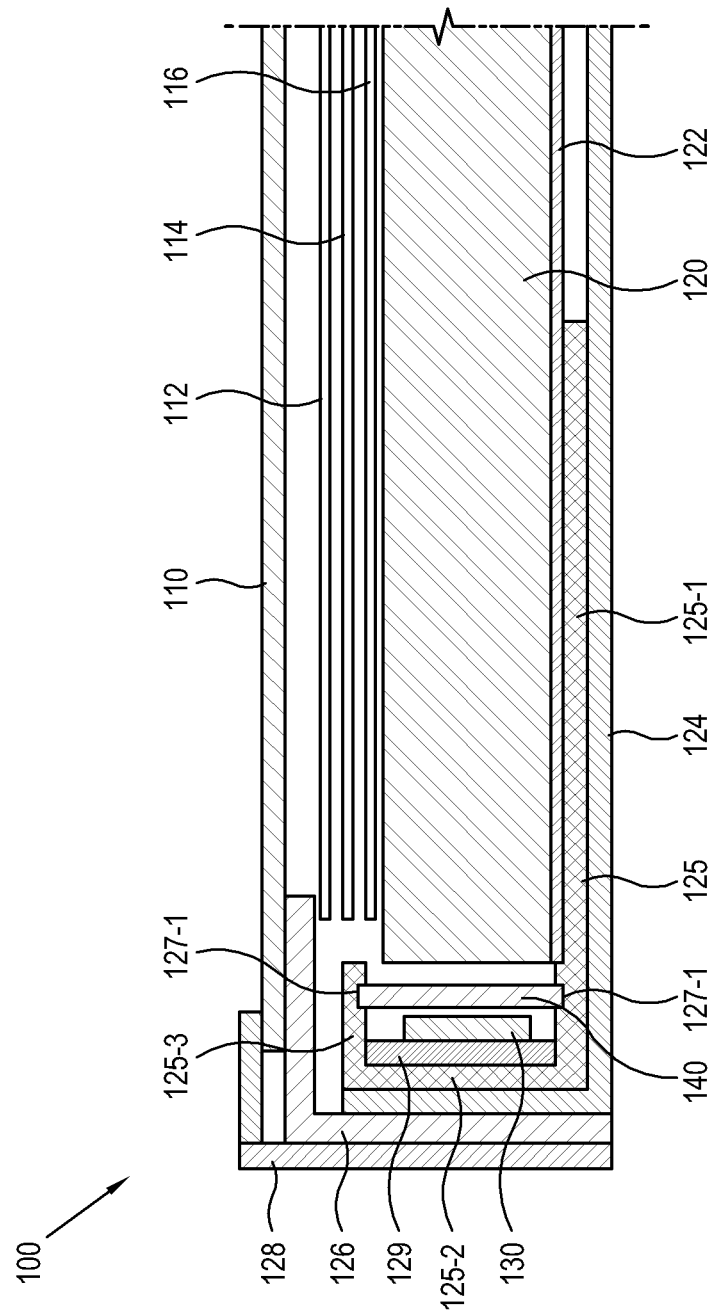
FIG. 2 is a schematic view of an LCD device having a backlight unit according to a second exemplary embodiment.

FIG. 2 is a schematic view of an LCD device having a backlight unit according to a second exemplary embodiment. The QD bar 140 is placed between the LED 130 and the light guide plate 120. In this exemplary embodiment, the QD bar 140 is fastened to a heat sinking plate 125 arranged on the rear of the printed circuit board 129 used as a light source supporting member. Furthermore, the heat sinking plate 125 extends along the rear of the light guide plate 120 and the reflection sheet 122. Here, the heat sinking plate 125 is to radiate heat from the LED 130.

As shown in FIG. 2, the heat sink 125 to which the QD bar 140 is fastened includes a main body part 125-1 which extends past the lateral side of the light guide plate 120 toward an outskirt supporting frame 128 and in parallel with the rear of the light guide plate 120, an erect part 125-2 bent from the main body part which extends in parallel with the lateral side of the light guide plate 120, and a bending end part 125-3 which is bent from the erect part, extends toward the light guide plate 120 in parallel to the main body part, and is spaced apart from the main body part by a length of the erect part.

A space formed by the main body part 125-1, the erect part 125-2 and the bending end part 125-3 of the heat sinking plate 125 accommodates the light source 130, the light source supporting member 129 and the QD bar 140.

The bending end part 125-3 and the main body part 125-1 of the heat sinking plate 125 are opposite to each other, and the opposite parts are respectively formed with grooves 127-1 as a QD-bar fastening unit. The QD bar 140 may be fitted into and fastened to the grooves 127-1 opposite to each other. The above fastening method of fitting the QD bar 140 into the grooves 127-1 of the heat sinking plate 125 is nothing but an example. Alternatively, the QD bar 140 may be supported on the heat sinking plate 125 by various methods. The groove 127-1 of the heat sinking plate 125 may be provided in either of the bending end part 125-3 or the main body part 125-1.

According to the second exemplary embodiment, the QD bar 140, the light source unit 129, 130 and the heat sinking plate 125 are assembled as a single body, and it is thus convenient and easy to arrange them adjacent to the lateral side of the light guide plate 120. Alternatively, the QD bar 140 may be fastened after previously arranging the light source unit 129, 130 to the lateral side of the light guide plate 120. The QD bar 140 is arranged within the assembly such that spaces (i.e., air gaps) are present between itself and the LED 130 and itself and the light guide plate 120.

The light source unit 129, 130 shown in FIG. 2 is a top-view type where the printed circuit board 129 used as the light source supporting member is arranged in parallel with the lateral side of the light guide plate 120. The printed circuit board 129 may be supported by the erect part 125-2 of the heat sinking plate 125. Of course, the light source unit 129, 130 the side-view type may be used as shown in FIG. 1.

Figure 3:
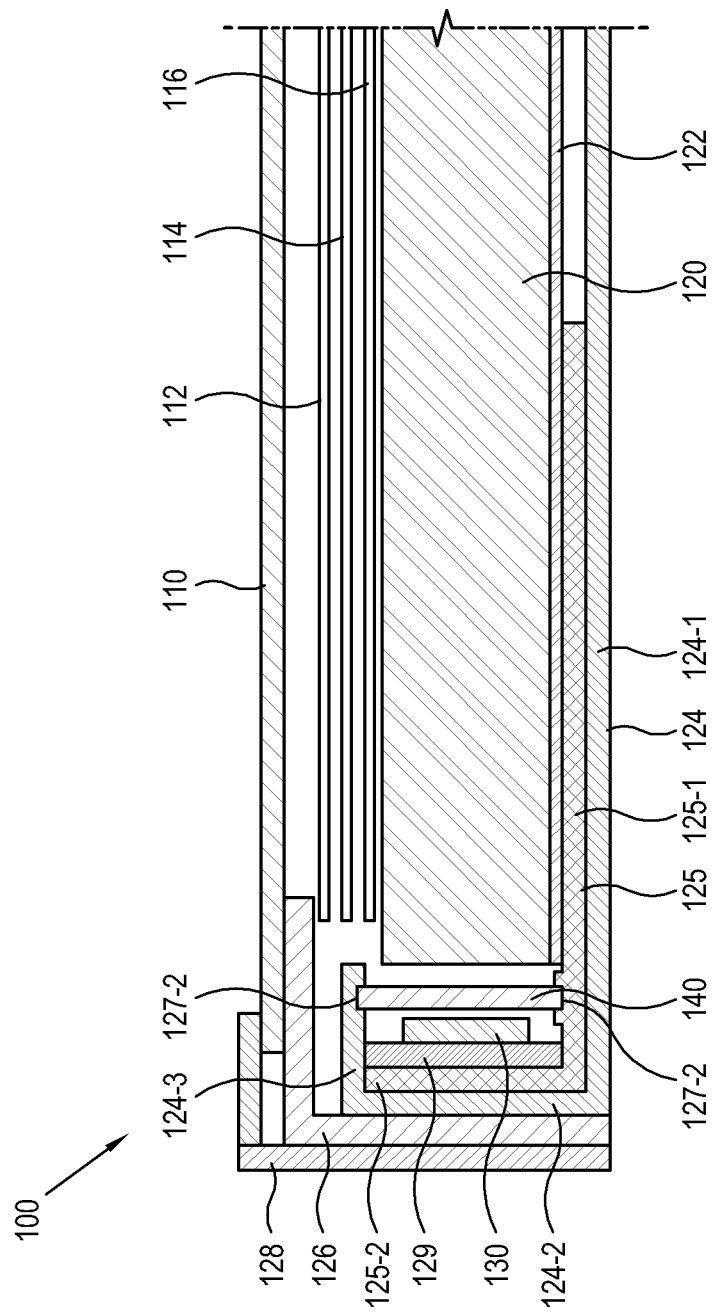
FIG. 3 is a schematic view of an LCD device having a backlight unit according to a third exemplary embodiment.

FIG. 3 is a schematic view of an LCD device having a backlight unit according to a third exemplary embodiment. The QD bar 140 may be fastened to the heat sinking plate 125 and a light guide plate supporting frame 124.

The light guide plate supporting frame 124 may include a main body part 124-1 that is parallel with the rear of the light guide plate 120 and extends past of the lateral side of the light guide plate 120 toward an outskirt supporting frame 128, an erect part 124-2 that is bent from the main body part 124-1 and extends in parallel with the lateral side of the light guide plate 120, and a bending end part 124-3 that is bent from the erect part 124-2 and extends toward the light guide plate 120.

The heat sinking plate 125 is placed behind the light guide plate 120 and arranged between the light guide plate 120 and the light guide plate supporting frame 124. At least a main body part 125-1 of the heat sinking plate 125 is opposite to the bending end part 124-3 of the light guide plate supporting frame 124, and an erect part 125-2 of the heat sinking plate 125 is disposed between the erect part 124-2 of the light guide plate supporting frame 124 and the light source supporting member 129.

The bending end part 124-3 of light guide plate supporting frame 124 and the main body part 125-1 of the heat sinking plate 125, which are opposite to each other, include a groove 127-2 as the QD-bar fastening unit into which the QD bar 140 can be fitted. If the heat sinking plate 125 has no part opposite to the bending end part 124-3 of the light guide plate supporting frame 124 or there is no heat sinking plate 125, the groove 127-2 may be provided in the main body part 124-1 of the light guide plate supporting frame 124. The groove 127-2 to which the QD bar 140 is fitted may be provided in either of the bending end part 124-2 of the light guide plate supporting frame 124 or the heat sinking plate 125.

According to the third exemplary embodiment, the QD bar 140 may be provided in the light guide plate 120 as being previously manufactured together with the light source unit 129, 130, the heat sinking plate 125 and the light guide plate supporting plate 124. Also, the QD bar 140 may be fitted to the groove 127-2 provided in at least one of the heat sinking plate 125 and the light guide plate supporting frame after the light source unit 129, 130, the heat sinking plate 125 and the light guide plate supporting frame 124 are first arranged on the lateral side of the light guide plate 120.

Figure 4A:
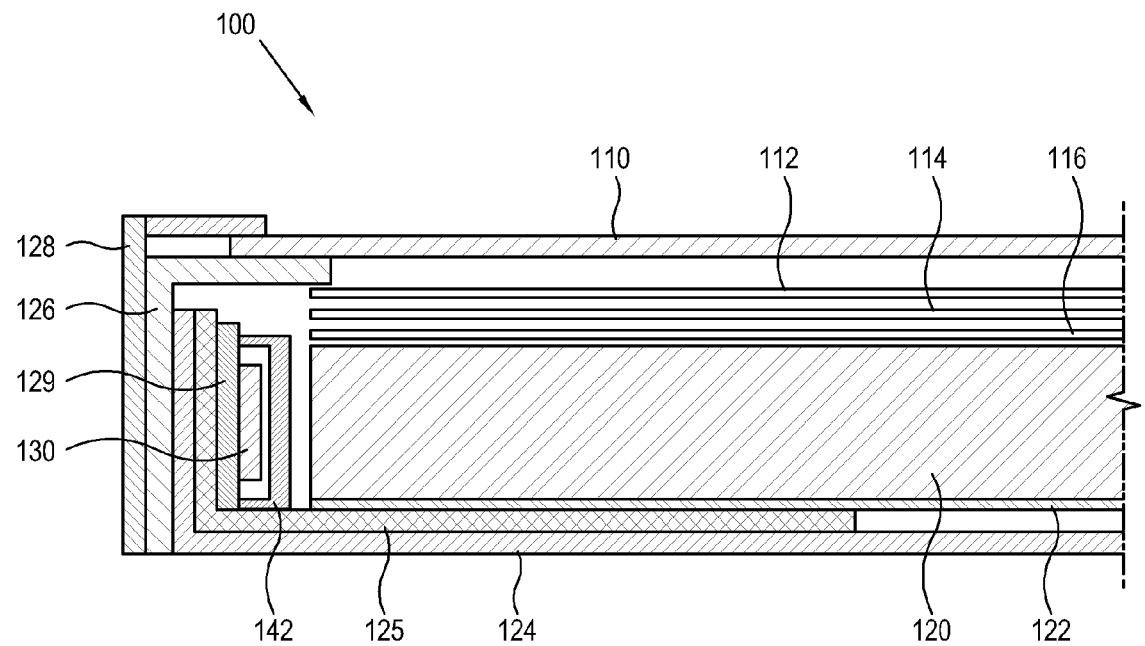
FIGS. 4A and 4B are schematic views of an LCD device having a backlight unit according to a fourth exemplary embodiment.
Figure 4B:
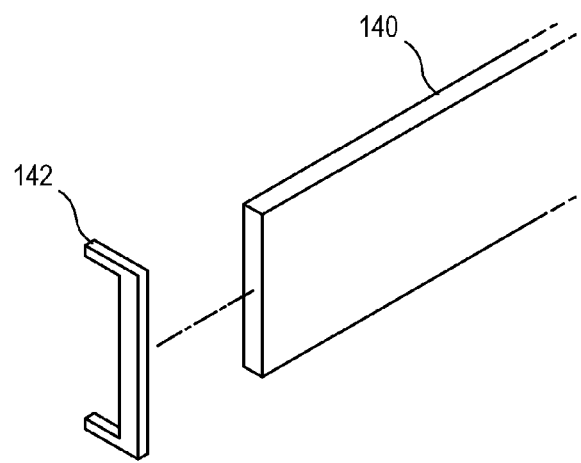

FIGS. 4A and 4B are schematic views of an LCD device having a backlight unit according to a fourth exemplary embodiment. The QD bar 140 may be fastened to a light source supporting member 129 supporting the LED 130 by a connecting members 142 (only one shown) attached as a fastening means to the opposite ends of the QD bar 140. The connecting members 142 may be attached to the QD bar 140 by an adhesive, and may be attached to other sides of the QD bar 140 as well as the opposite ends.

The QD bar 140 may be fastened to the heat sinking plate 125 or the light guide plate supporting frame 124 instead of being fasted to the light source supporting member 129.

Figure 5:
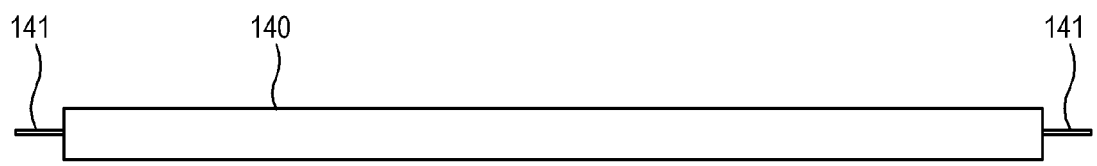
FIG. 5 is a view showing a QD bar with a fastening pin according to an exemplary embodiment.
Figure 6:
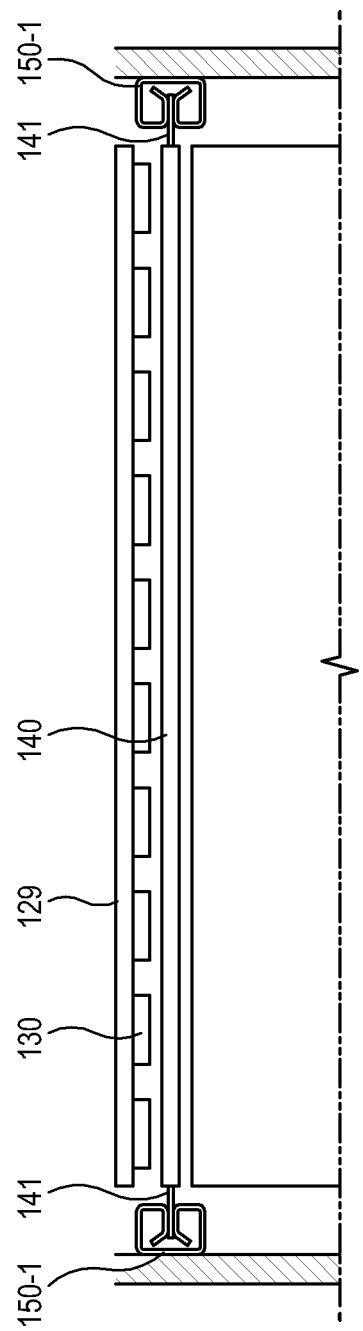
FIG. 6 is a schematic view of an LCD device having a backlight unit employing the QD bar shown in FIG. 5 according to a fifth exemplary embodiment.

FIGS. 5 and 6 are schematic views of a backlight unit according to a fifth exemplary embodiment. As shown in FIG. 5, the backlight unit may include a fastening pins 141 attached as the QD-bar fastening unit to the opposite ends of the QD bar 140 and which extend lengthwise. The supporting frame adjacent to the opposite ends of the QD bar 140, i.e., the supporting frame arranged on the top and bottom sides adjacent to the lateral sides of the light guide plate where the light source unit 129, 130 is placed is attached with a socket 150-1, or other type of receptacle, to which the fastening pin 141 is fitted. The socket 150-1 is provided in the form of a receptacle and internally includes two engaged elastic pieces. Alternatively, the socket 150-1 may have various coupling structures such as a latch lock, etc.

The fastening pin 141 may be fitted into the socket 150-1 in a lengthwise direction of the QD bar 140. At this time, it may be difficult to insert the fastening pin 141 in the lengthwise direction if an inner space is narrow. Thus, the fastening pin 141 may be inserted in the socket 150-1 in a direction of penetrating into or out of the drawings. If the socket's mouth for the fastening pin is differently arranged, the QD bar 140 may be inserted in a direction perpendicular to the lengthwise direction.

Figure 7:
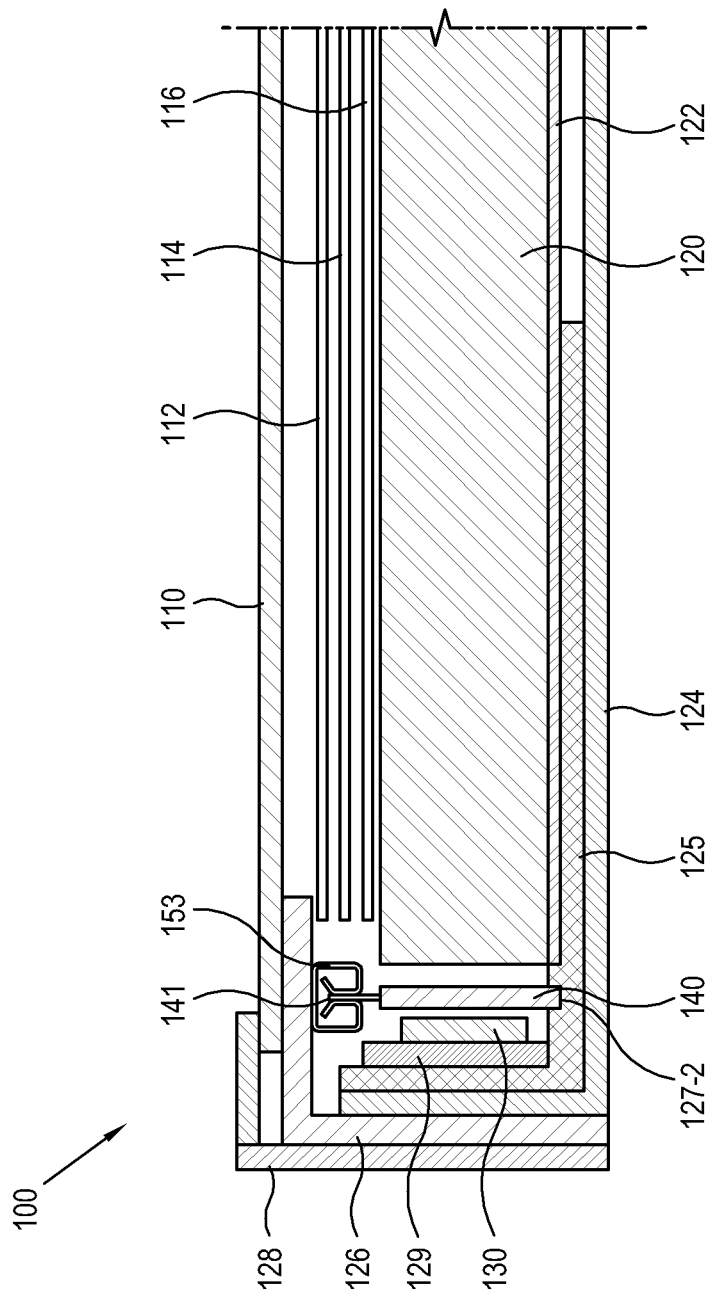
FIG. 7 is a schematic view of an LCD device having a backlight unit according to a sixth exemplary embodiment.

FIG. 7 is a schematic view of a backlight unit according to a sixth exemplary embodiment. The QD bar 140 is provided with a fastening pin 141 extended perpendicularly to the lengthwise direction at one side Adjacent to the lateral side of the light guide plate 120, the light source unit 129, 130, the heat sinking plate 125, the light guide plate supporting frame 124, a middle molding unit 126, and an outskirt supporting frame 128 are arranged in sequence.

Each of the middle molding unit 126 and the outskirt supporting frame 128 includes a lateral part which extends in parallel with the lateral side of the light guide plate 120, and a front part bent from the lateral part and which extends toward the light guide plate 120 in parallel with the light guide plate 120. As shown in FIG. 7, the LCD panel 110 is secured by being fitted between the front part of the middle molding unit 126 and the front part of the outskirt supporting frame 128.

The front part of the middle molding unit 126 is internally attached with a receptacle socket 153 to which the fastening pin 141 is fitted.

The fastening pin 141 may be fitted to the socket 153 in a lengthwise direction of the fastening fin 141, i.e., in a direction from bottom to top as seen from the drawings. At this time, it may be difficult to insert the fastening pin 141 if an inner space is narrow. Thus, the fastening pin 141 may be inserted in the socket 150-1 in a direction of penetrating the drawings. If the socket's mouth for the fastening pin 141 is differently arranged, the QD bar 140 may be inserted in a direction perpendicular to the lengthwise direction.

The heat sinking plate 125 is positioned opposite to the socket 153 and may be provided with the groove 127-2.

One side of the QD bar 140 may be fastened by fitting the fastening pin 141 to the socket arranged in the front part of the middle molding unit 126, and the other side may be fastened by fitting the QD bar 140 itself to the groove 127-2 of the heat sinking plate 125. Alternatively, the QD bar 140 may be fastened by only coupling between the fastening pin 141 and the socket 153. Also, the QD bar 140 may be fastened by only fitting the other side to the groove 127-2 of the heat sinking plate 125.

Figure 8:
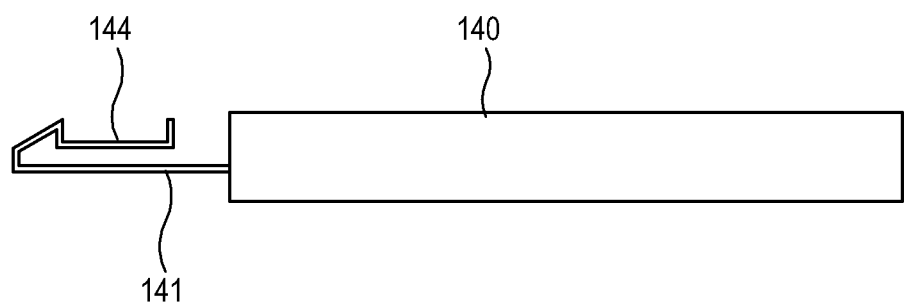
FIG. 8 is a view showing a QD bar with another fastening pin according to an exemplary embodiment.

FIG. 8 is a view showing the QD bar 140 of FIG. 5 with another fastening pin 141 according to an exemplary embodiment, in which the fastening pin 141 may include an elastic projection 144.

Figure 9:
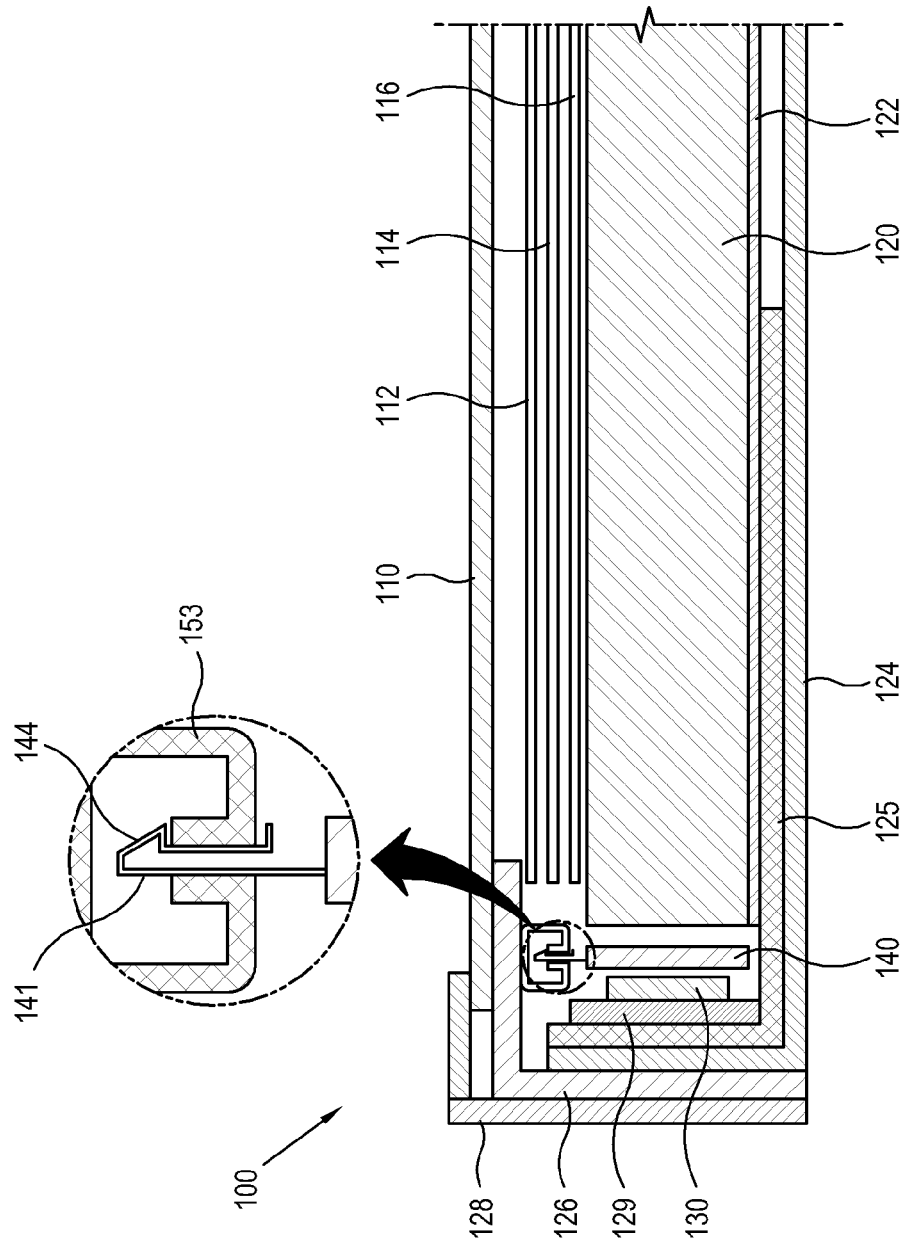
FIG. 9 is a schematic view of an LCD device having a backlight unit employing the QD bar shown in FIG. 8 according to a seventh exemplary embodiment.

FIG. 9 is a schematic view of a backlight unit according to a seventh exemplary embodiment. The fastening pin 141 attached to the QD bar 140 includes the elastic projection 144 shown in FIG. 8, and may be fitted to the socket 153 attached to the front part of the middle molding unit 126. Such a structure makes the QD bar 140 be more firmly fastened. Accordingly, it is possible to stably maintain the fastening of the QD bar 140 without the fitting based on the groove 127-2 of the heat sinking plate 125 as described in the sixth exemplary embodiment.

Figure 10:
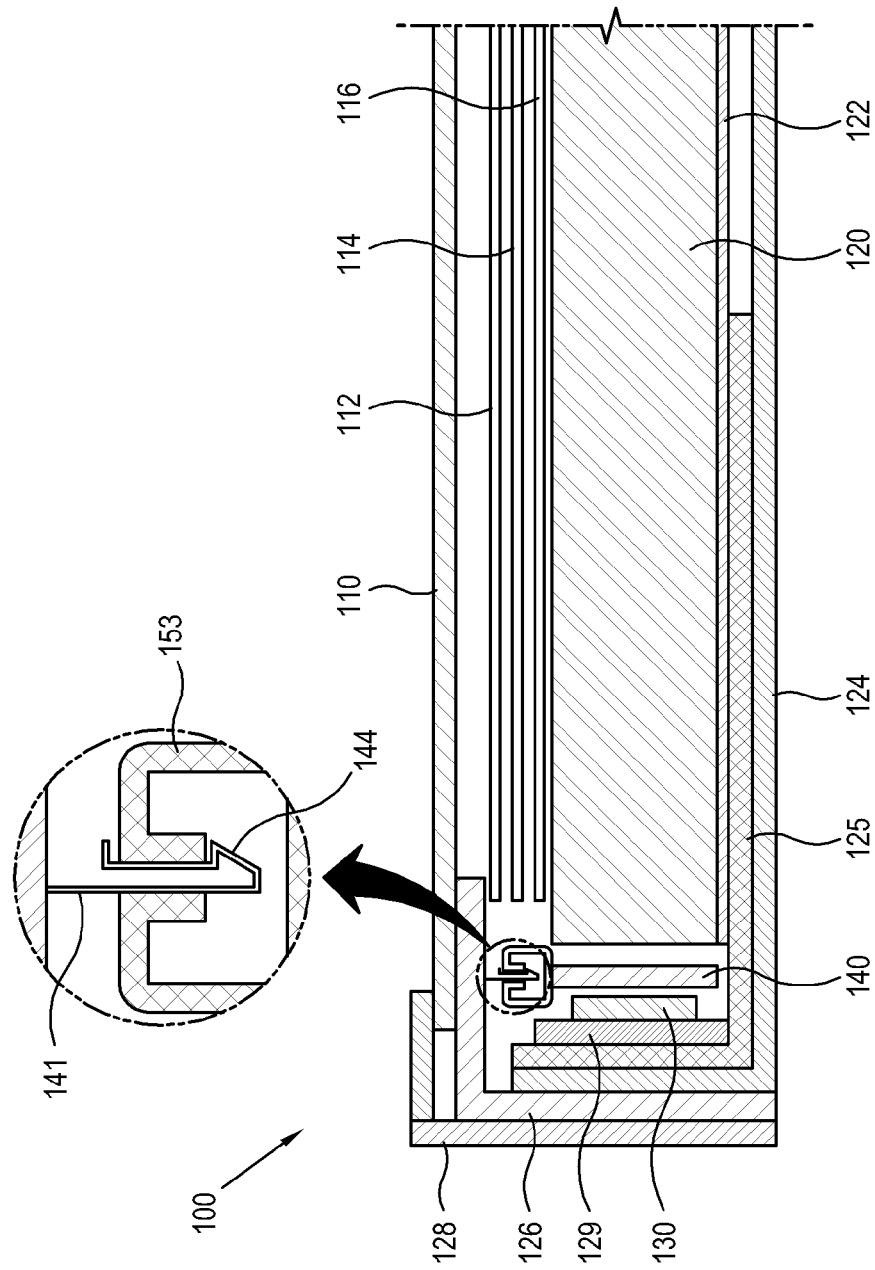
FIG. 10 is a schematic view of an LCD device having a backlight unit employing the QD bar shown in FIG. 8 according to an eighth exemplary embodiment.

FIG. 10 is a schematic view of a backlight unit according to an eighth exemplary embodiment. In this exemplary embodiment, in contrast to the seventh exemplary embodiment, the fastening pin 141 is attached to the front part of the middle molding part 126, and the socket 153 is attached to the QD bar 140.

Figure 11:
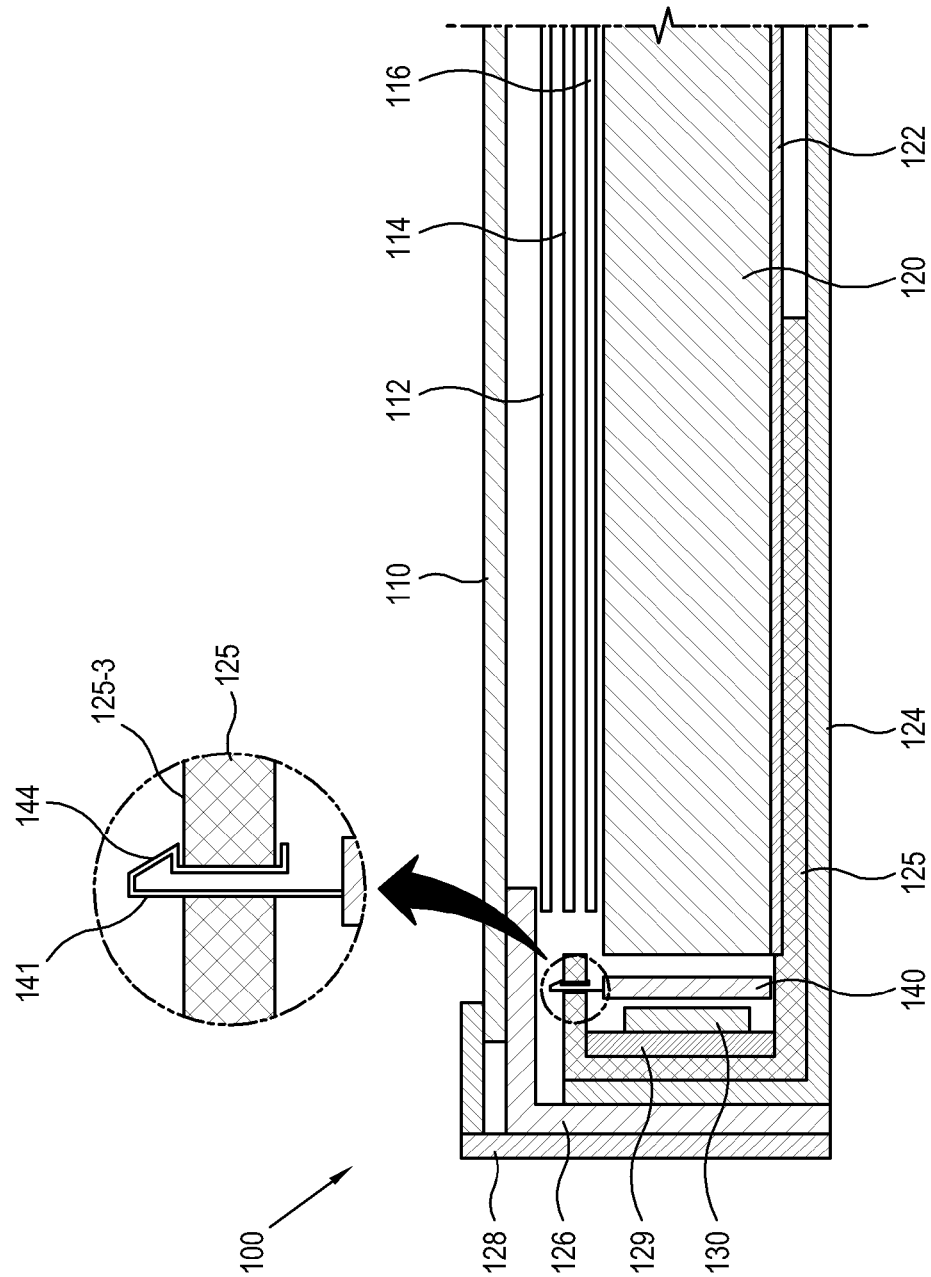
FIG. 11 is a schematic view of an LCD device having a backlight unit employing the QD bar shown in FIG. 8 according to a ninth exemplary embodiment.

FIG. 11 is a schematic view of a backlight unit according to a ninth exemplary embodiment. In this exemplary embodiment, the QD bar 141 is provided with the fastening pin 141 having the elastic projection 144.

The heat sinking plate 125 includes the bending end part 125-3 extended toward the light guide plate 120 at the lateral side of the light guide plate 120. The bending end part 125-3 of the heat sinking plate 125 includes a through hole to which the fastening pin 141 is fitted. The through hole may be formed in the bending end part of the light source supporting member 129 which is bent to extend toward the light guide plate 120 at the lateral side of the light guide plate 120, the bending end part 124-3 of the light guide plate supporting frame 124, and the bending end part of the middle molding part 126 as well as that of the heat sinking plate 125.

Figure 12:
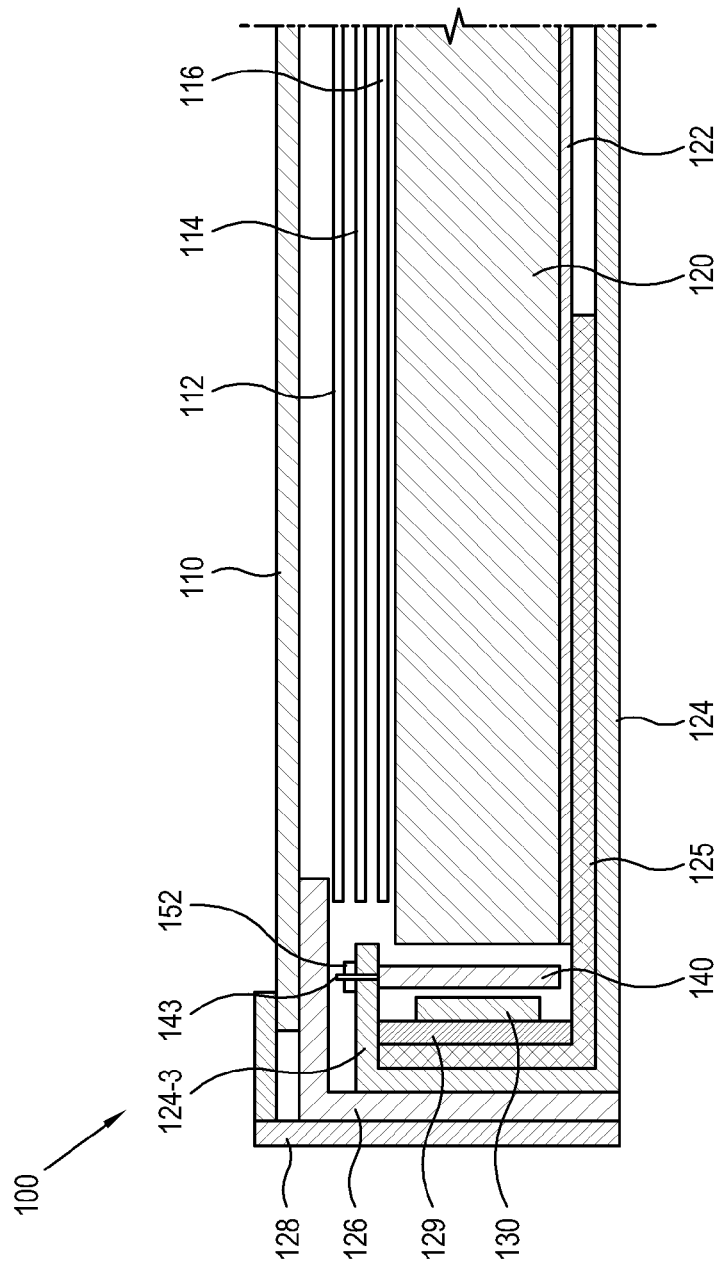
FIG. 12 is a schematic view of an LCD device having a backlight unit according to a tenth exemplary embodiment.

FIG. 12 is a schematic view of a backlight unit according to a tenth exemplary embodiment. In this exemplary embodiment, the QD bar 141 is provided with the fastening pin 141 having a bolt 143. The light guide plate supporting frame 124 includes the bending end part 124-3 which extends toward the light guide plate 120 at the lateral side of the light guide plate 120. The bending end part 124-3 of the light guide plate supporting frame 124 includes a through hole in which the bolt 143 of the fastening pin 131 is inserted.

The QD bar 140 may be fastened by inserting and penetrating the bolt 143 of the fastening pin 141 into the through hole of the bending end part of the light guide plate supporting frame 124, and then fastening the bolt 143 with a nut 152.

Figure 13:
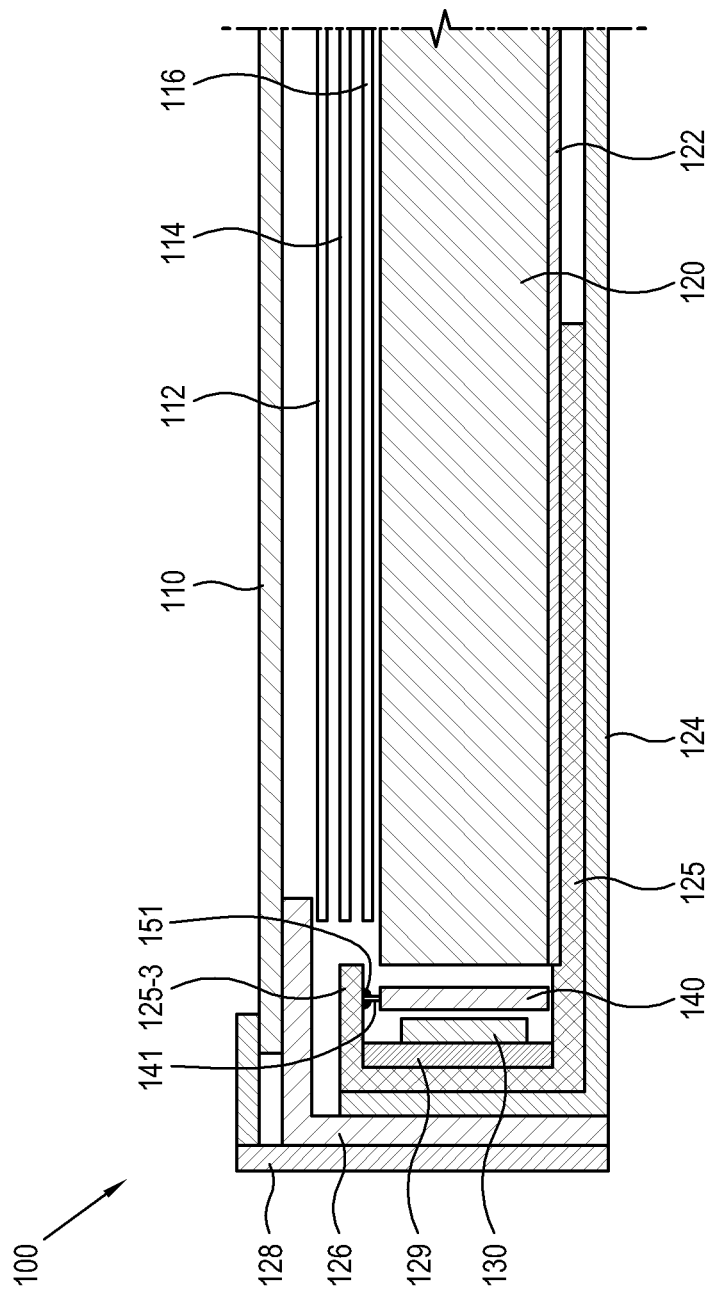
FIG. 13 is a schematic view of an LCD device having a backlight unit according to an eleventh exemplary embodiment.

FIG. 13 is a schematic view of a backlight unit according to an eleventh exemplary embodiment. In this exemplary embodiment, the QD bar 140 is provided with the fastening pin 141. The heat sinking plate 125 includes the bending end part 125-3 which extends towards the light guide plate 120 at the lateral side of the light guide plate 120. The fastening pin 141 of the QD bar 140 may be directly soldered or welded to the bending end part 12-3 of the heat sinking plate 125.

Figure 14A:
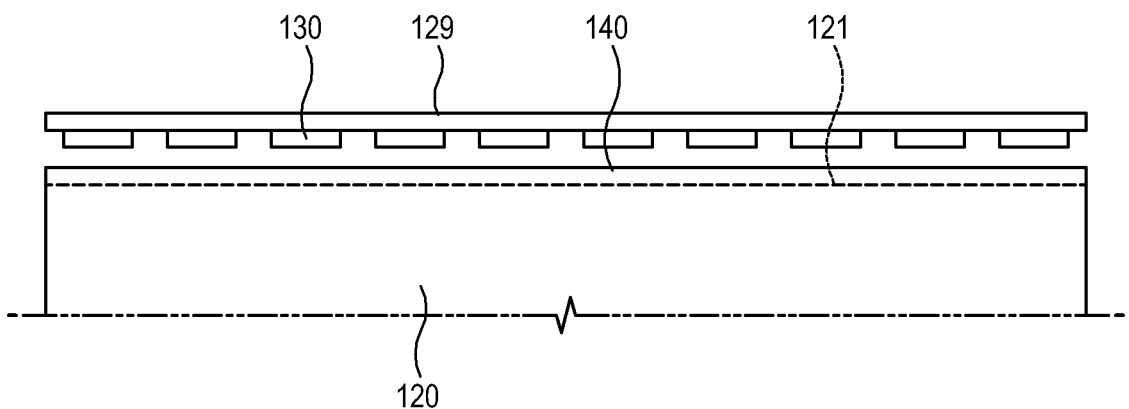
FIGS. 14A and 14B are schematic views of an LCD device having a backlight unit and a light guide plate according to a twelfth exemplary embodiment.
Figure 14B:
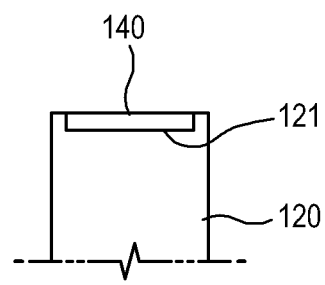

FIGS. 14A and 14B are schematic views of a backlight unit according to a twelfth exemplary embodiment. The light guide plate 120 includes a groove 121 at its lateral side, in which the QD bar 140 is inserted. The QD bar 140 itself is fitted and fastened to the groove 121 formed at the lateral side of the light guide plate 120.

Figure 15:
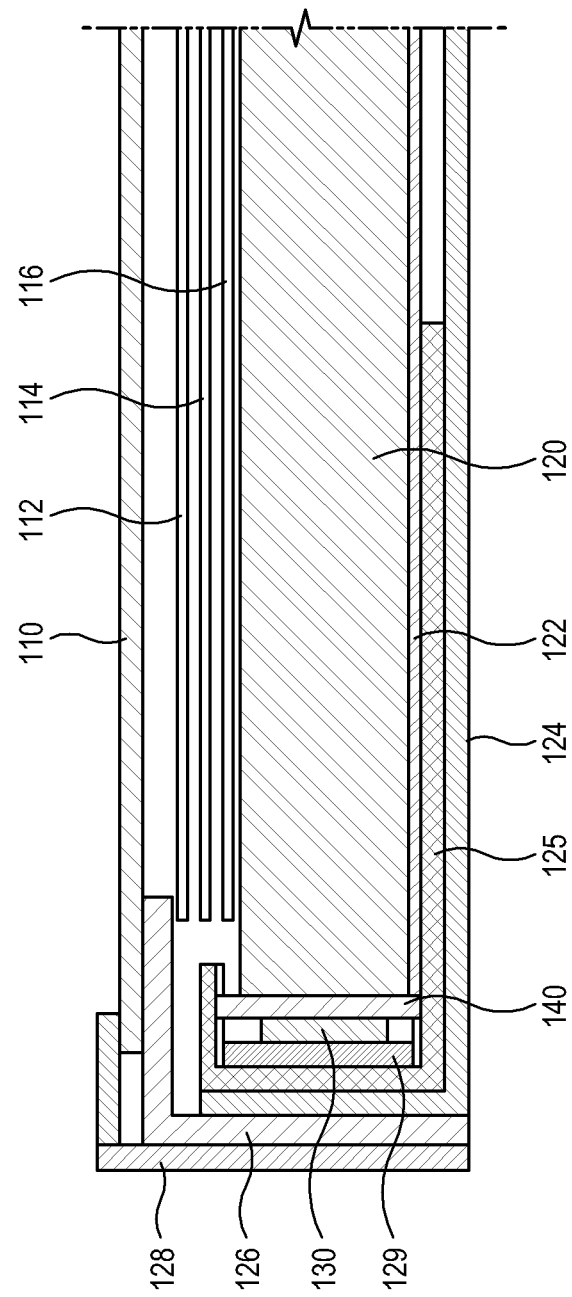
FIG. 15 is a schematic view of an LCD device having a backlight unit according to a thirteenth exemplary embodiment.
Figure 18:
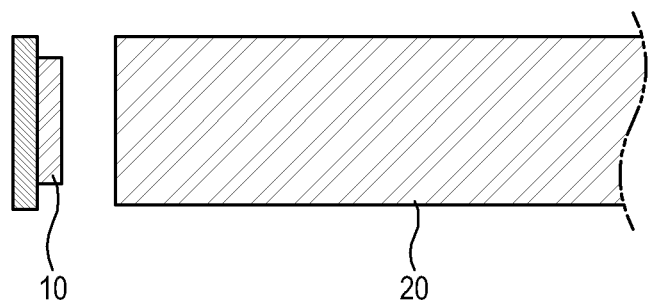
FIG. 18 is a schematic view of major parts taken from a related backlight unit.
Figure 19:
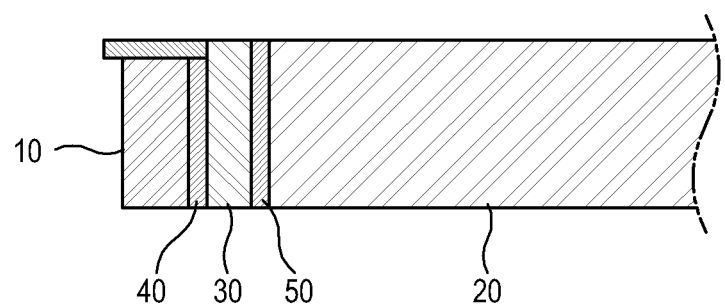
FIG. 19 is a schematic view of major parts taken from a related art backlight unit.

FIG. 15 is a schematic view of a backlight unit according to a thirteenth exemplary embodiment. The QD bar 140 is closely adhered and fastened between the light source unit 129, 130 and the lateral side of the light guide plate 120. Below, a method of adhering and fastening the QD bar 140 will be described with reference to FIG. 17.

First, the heat sinking plate 125 includes the main body part 125-1 which is configured to extend past of the lateral side of the light guide plate in parallel with the rear of the light guide plate 120, the erect part 125-2 which is bent from the main body part 125-1 and extends in parallel with the lateral side of the light guide plate 120, and the bending end part 125-3 which is bent from the erect part 125-2 and extends toward the light guide plate 120 at the lateral side of the light guide plate 120. At this time, the heat sinking plate 125 may include a predetermined space formed by the main body part 125-1, the erect part 125-2 and the bending end part 12-3. Also, the bending end part 125-3 and the main body part 125-1 of the heat sinking plate 125 may be formed with a QD-bar guide groove 160.

The QD-bar guide groove 160 may be formed to extend in a lengthwise direction of the QD bar, or may be formed to extend in a direction perpendicular to the lengthwise direction of the QD bar as shown in FIG. 17.

Next, the light source unit 129, 130 and the QD bar 140 are sequentially inserted in the predetermined space of the heat sinking plate 125. At this time, the inserted light source unit 129, 130 and heat sinking plate 125 may be adhered and fastened to the heat sinking plate 125 within the predetermined space by an adhesive.

Then, the heat sinking plate 125, including the light source unit 129, 130, and the QD bar 140 are arranged at the lateral side of the light guide plate 120 and pressed. Consequently, the heat sinking plate 125, the light source unit 129, 130 and the QD bar 140 are closely adjoined to the lateral side of the light guide plate 120. In this pressed state, if the heat sinking plate 125 is fastened to the adjacent light guide plate supporting frame 124 or to the middle molding part 126, the QD bar 140 is fastened without any separate QD-bar fastening unit. No adhesive layer is used between the LED 30 and the QD bar 140, or between the QD bar 140 and the light guide plate 120, thus preventing light distortion caused by adhesive layers.

In FIG. 17, the heat sinking plate 125 is used as a pressing member for pressing the QD bar 140 toward the lateral side of the light guide plate 120. The pressing member may be the light source supporting member 129, the light guide plate supporting frame 124 or the middle molding part 126 as well as the heat sinking plate 125.

Although a few exemplary embodiments have been shown and described, it will be appreciated by those skilled in the art that changes may be made in these exemplary embodiments without departing from the principles and spirit of the invention, the scope of which is defined in the appended claims and their equivalents.

What is claimed is:

1. A backlight unit comprising:
   a light guide plate which guides incident light from a lateral side of the light guide plate toward a liquid crystal display (LCD) panel placed in front of the light guide plate;
   a blue light source unit which comprises a blue light source which emits a blue light and a light source supporting member which supports the blue light source and is arranged adjacent to the lateral side of the light guide plate;

a supporting frame which is arranged in the backlight unit;

a quantum dot (QD) bar which is arranged between the lateral side of the light guide plate and the blue light source, and converts a color of the blue light emitted from the blue light source to a white light; and a QD-bar fastening unit which fastens the QD bar to at least one of the light source supporting member and the supporting frame, wherein the light source supporting member and the supporting frame cannot be moved, wherein the QD-bar fastening unit comprises recessed portions of at least one of the light source supporting member and the supporting frame.

2. The backlight unit according to claim 1, wherein the QD bar is spaced apart from at least one of the light guide plate and the blue light source.

3. The backlight unit according to claim 1, wherein the blue light source comprises a blue light emitting diode (LED).

4. The backlight unit according to claim 1, wherein the light source supporting member comprises a printed circuit board (PCB) mounted with the blue light source thereon.

5. The backlight unit according to claim 1, wherein the supporting frame comprises at least one of a heat sinking plate which radiates heat from the blue light source, a light guide plate supporting frame which supports the light guide plate, and a middle molding part which extends along a lateral end of the backlight unit, between a front and a rear of the backlight unit.

6. The backlight unit according to claim 5, wherein the at least one of the heat sinking plate, the light guide plate, and the middle molding part comprises a bending end part which extends from the lateral end of the backlight unit toward the lateral side of the light guide plate.

7. The backlight unit according to claim 1, wherein the QD-bar fastening unit comprises an adhesive.

8. The backlight unit according to claim 1, wherein the QD-bar fastening unit comprises a groove which is formed in at least one of the light source supporting member and the supporting frame and to which the QD bar is fitted therein.

9. The backlight unit according to claim 1, wherein the QD-bar fastening unit comprises a connecting member which connects the QD bar to the light source supporting member.

10. The backlight unit according to claim 9, wherein the connecting member fastens the QD bar to the light source supporting member such that the QD bar is separated from the light source supporting member so that the blue light source is accommodated between the light source supporting member and the QD bar.

11. The backlight unit according to claim 1, wherein the QD-bar fastening unit comprises:

a fastening pin which is coupled to the QD bar; and a socket which is provided on at least one of the light source supporting member and the supporting frame, and is coupled to the fastening pin.

12. The backlight unit according to claim 1, wherein the QD-bar fastening unit comprises:

a socket which is coupled to the QD bar; and a fastening pin which is provided in at least one of the light source supporting member and the supporting frame, and is coupled to the socket.

13. The backlight unit according to claim 1, wherein the QD-bar fastening unit comprises:

a fastening pin which is coupled to the QD bar and has an elastic projection; and a fastening part which is provided in at least one of the light source supporting member and the supporting frame, and which accommodates and is coupled to the elastic projection.

14. The backlight unit according to claim 1, wherein the QD-bar fastening unit comprises:

a fastening pin which is provided in at least one of the light source supporting member and the supporting frame, and which has an elastic projection; and a fastening part which is coupled to the QD bar, and which accommodates and is coupled to the elastic projection.

15. The backlight unit according to claim 1, wherein the QD-bar fastening unit comprises:

a bolt which is coupled to the QD bar; and a nut which is fastened to the bolt with at least one of the light source supporting member and the supporting frame interposed between the nut and the bolt.

16. The backlight unit according to claim 1, wherein the QD-bar fastening unit comprises a fastening pin which is coupled to the QD bar; and a welding part which couples at least one of the light source supporting member and the supporting frame to the fastening pin.

17. The backlight unit according to claim 1, wherein the QD-bar fastening unit comprises a groove formed at a lateral end of the backlight unit and which receives the QD bar inserted therein.

18. A method of manufacturing a backlight unit, the method comprising:

arranging a light guide plate behind a liquid crystal display (LCD) panel;

preparing a light source unit by arranging a blue light source onto a light source supporting member and fastening a quantum dot (QD) bar to the light source supporting member, wherein the quantum dot (QD) bar converts a color of the blue light emitted from the blue light source to a white light;

arranging the light source unit to a lateral side of the light guide plate so that the QD bar is arranged between the blue light source and the light guide plate; and fastening the light source unit to a supporting frame arranged in the backlight unit, wherein the light source supporting member and the supporting frame cannot be moved, wherein the QD-bar fastening unit comprises recessed portions of at least one of the light source supporting member and the supporting frame.

19. The method according to claim 18, wherein the supporting frame comprises at least one of a heat sinking plate which radiates heat from the blue light source, a light guide plate supporting frame which supports the light guide plate, and a middle molding part which extends along a lateral end of the backlight unit, between a front and a rear of the backlight unit.

20. A liquid crystal display (LCD) device comprising:

the backlight unit according to claim 1;

a LCD panel which comprises a liquid crystal layer, a thin film transistor layer arranged between the liquid crystal layer and the light guide plate of the backlight unit and which controls light passing through the liquid crystal layer, and a color filter layer which materializes color of light passed through the liquid crystal layer.

* * * * *